United States Patent Office.

MEINHARD HOFFMANN AND CARL KROHN, OF FEEHENHEIM, NEAR FRANKFORT-ON-THE-MAIN, ASSIGNORS TO LEOPOLD CASSELLA & CO., OF FRANKFORT-ON-THE MAIN, GERMANY.

BROWN AZO DYE.

SPECIFICATION forming part of Letters Patent No. 514,931, dated February 20, 1894.

Application filed June 20, 1892. Serial No. 437,285. (Specimens.) Patented in England April 22, 1891, No. 6,972, and in France August 15, 1891, No. 201,770.

*To all whom it may concern:*

Be it known that we, MEINHARD HOFFMANN and CARL KROHN, subjects of the Emperor of Germany, and residents of Feehenheim, near Frankfort-on-the-Main, Germany, have invented new and useful Improvements in the Production of New Azo Colors, (Brown,) of which the following is a specification.

This invention, for which patents have been taken in Great Britain, No. 6,972, dated April 22, 1891, and France, additional certificate dated May 15, 1891, to Patent No. 201,770, dated November 6, 1889, relates to the production of new secondary disazo dyestuffs deriving from the amidonaphtholdisulfo acid H which is described in United States Patent, No. 464,135, of December 1, 1891.

We have found that those coloring matters which result from the combination or tetrazo bodies with the acid H in presence of alkalies, can be diazotized with one or two molecules of nitrite and that the diazo compounds thus obtained can be further combined with amines or phenols. This process is applicable to those substances which are produced by the action of one molecule tetrazo-diphenyle or its analogues upon one molecule of acid H and one molecule of another amine or phenol, such as phenol, salicylic acid, naphtholsulfo acid, dioxynaphtalenesulfo acid, alpha naphtylamin, meta-phenylenediamin, gamma-amidonaphtholsulfo acid.

It is a well known fact that the said process (diazotation of a dyestuff, &c.,) can be carried out on the fiber and it will be sufficient to remark that also this manner of producing the new secondary dyestuffs forms part of the present specification.

For the production of the new colors we proceed for instance as follows: Seventy-one kilos of the dyestuff produced by combination of one molecule of tetrazodiphenyl with one molecule of salicylic acid and one molecule of acid H are dissolved in one thousand liters of water. By addition of nine kilos nitrite and fifty kilos muriatic acid the diazo compound is formed, which separates in the form of a dark, insoluble precipitate. The latter is filtered off and introduced into the alkaline solution of twelve kilos meta-phenylenediamin or meta-toluylenediamin. The dyestuff is precipitated by common salt, filtered and dried. It dyes unmordanted cotton a fast yellowish brown.

Coloring matters of similar properties are obtained if in the foregoing example in the place of tetrazodiphenyl, the tetrazo derivatives of other paradiamins, such as tolidin, methylbenzidin, diamidoethoxydiphenyl, diamidodiphenolether, diamidoazobenzene, &c., are used. The salicylic acid may be replaced by phenol, cresol, cresotinic acid.

Having now particularly described our invention, what we claim as new, and desire to secure by Letters Patent, is—

1. The process of producing azo colors, consisting of the following steps: the disazo coloring matters which are produced by combining tetrazo compounds with one molecule of amidonaphtholdisulfo acid H and one molecule of a phenol or an amin, are brought together with one or two molecules of nitrite in an acid solution and the diazo compounds thus obtained are introduced into the solution of phenols or amins, substantially as described.

2. The new dyestuff hereinbefore described being a combination of the dyestuff derived from a tetrazo compound, one molecule of amidonaphtholdisulfonic acid H and one molecule of a phenol such as phenol or salicylic acid with a metadiamin, forming a dark brown powder, easily soluble in water with a brown shade, insoluble in alcohol, dissolving in strong sulfuric acid with a violet shade, from this solution the color separating on the addition of water in the form of a dark brown precipitate.

In testimony that we claim the foregoing as our invention we have signed our names, in presence of two witnesses, this 4th day of June, 1892.

MEINHARD HOFFMANN.
CARL KROHN.

Witnesses:
ALVESTO S. HOGUE,
JEAN GRUND.